(12) United States Patent
Lohel et al.

(10) Patent No.: US 11,361,411 B2
(45) Date of Patent: Jun. 14, 2022

(54) NEIGHBOR INFLUENCE COMPENSATION

(71) Applicant: QIAGEN GmbH, Hilden (DE)

(72) Inventors: Maiko Lohel, Hilden (DE); Thorsten Zerfass, Hilden (DE)

(73) Assignee: Qiagen GmbH, Hilden (DE)

( * ) Notice: Subject to any disclaimer, the term of this patent is extended or adjusted under 35 U.S.C. 154(b) by 597 days.

(21) Appl. No.: 16/333,952

(22) PCT Filed: Sep. 15, 2017

(86) PCT No.: PCT/EP2017/073341
§ 371 (c)(1),
(2) Date: Mar. 15, 2019

(87) PCT Pub. No.: WO2018/050854
PCT Pub. Date: Mar. 22, 2018

(65) Prior Publication Data
US 2021/0374915 A1 Dec. 2, 2021

(30) Foreign Application Priority Data

Sep. 16, 2016 (EP) .................................... 16189229

(51) Int. Cl.
*G06T 5/00* (2006.01)

(52) U.S. Cl.
CPC .... *G06T 5/003* (2013.01); *G06T 2207/10024* (2013.01); *G06T 2207/10064* (2013.01);
(Continued)

(58) Field of Classification Search
CPC ........... G06T 5/003; G06T 2207/10064; G06T 2207/20021; G06T 2207/10024; G06T 2207/30072
(Continued)

(56) References Cited

U.S. PATENT DOCUMENTS

| | | | |
|---|---|---|---|
| 2004/0077090 A1* | 4/2004 | Short | G01N 33/6818 506/1 |
| 2006/0184038 A1 | 8/2006 | Smith et al. | |
| 2008/0075380 A1* | 3/2008 | Dube | G06T 7/0012 382/255 |
| 2011/0007981 A1 | 1/2011 | Osher et al. | |

(Continued)

FOREIGN PATENT DOCUMENTS

| | | |
|---|---|---|
| WO | WO 96/42066 A1 | 12/1996 |
| WO | WO 2008/097455 A1 | 8/2008 |

(Continued)

OTHER PUBLICATIONS

International Search Report and Written Opinion of the International Searching Authority directed to related International Patent Application No. PCT/EP2017/073341, dated Aug. 11, 2017; 12 pages.

(Continued)

*Primary Examiner* — Ali Bayat
(74) *Attorney, Agent, or Firm* — Sterne, Kessler, Goldstein & Fox P.L.L.C.

(57) ABSTRACT

The invention relates to a method of neighbor influence compensation between a plurality of objects in at least one digital image, wherein the at least one digital image contains image information about a plurality of objects. Each of the plurality of objects is configured to receive at least one molecule comprising genetic information, wherein the at least one molecule is configured to receive a fluorescent compound, and the at least one digital image is taken by an optical imaging system during emission of electromagnetic radiation of the fluorescent compounds received by the at least one molecules.

20 Claims, 3 Drawing Sheets

(52) U.S. Cl.
CPC ............... *G06T 2207/20021* (2013.01); *G06T 2207/30072* (2013.01)

(58) Field of Classification Search
USPC ........................................................ 382/128
See application file for complete search history.

(56) References Cited

U.S. PATENT DOCUMENTS

2017/0369945 A1* 12/2017 Li .................... C12Q 1/6883
2019/0153532 A1* 5/2019 Bharadwaj .......... C12N 15/1093

FOREIGN PATENT DOCUMENTS

| WO | WO 2009/117119 A1 | 9/2009 |
| WO | WO 2014/020137 A1 | 2/2014 |

OTHER PUBLICATIONS

Sarder et al., "Deconvolution Methods for 3-D Fluorescence Microscopy Images," *IEEE Signal Processing Magazine*; vol. 23, No. 3, pp. 32-45, May 2006.

Small et al., "Fluorophore localization algorithms for super-resolution microscopy," *Nature Methods*; vol. 11, No. 3, pp. 267-279, (Feb. 27, 2014).

Voelkerding et al., "Next-Generation Sequencing: From Basic Research to Diagnostics," *Clinical Chemistry*, vol. 55, No. 4, pp. 641-658, 2009.

Metzker, Michael L., "Sequencing technologies—the next generation," *Nature Reviews/Genetics*, vol. 11, pp. 31-46, Jan. 2010.

Goodwin et al., "Coming of age: ten years of next-generation sequencing technologies," *Nature Reviews/Genetics*, vol. 17, pp. 333-351, Jun. 2016.

\* cited by examiner

NEIGHBOR INFLUENCE COMPENSATION

CROSS-REFERENCE TO RELATED APPLICATIONS

The present application is a National Stage Entry of International Application No. PCT/EP2017/073341, filed Sep. 15, 2017, which claims the benefit of European Patent Application No. 16189229.4, filed on Sep. 16, 2016, each of which is incorporated herein by reference in its entirety.

The present invention relates to systems and methods for neighbor influence compensation. More particularly, the present invention relates to neighbor influence compensation of electromagnetic radiation emitted by different fluorescent compounds in different color channels, preferably for DNA-sequencing.

Biotechnology, medicine and related technical fields are based on the analysis of molecules. Electronic devices can analyze molecules with high precision and specificity. Especially in the last years, automated electronic devices have been developed for analyzing large numbers of samples by routine methods. For example, modern DNA sequencing apparatus are used for routine analysis of large numbers of DNA probes. Protein samples can be analyzed by high throughput screening and related methods. Frequently, such electronic devices detect fluorescent signals emitted from the sample probes. This is possible when molecules, such as nucleic acids or proteins, have been labeled with fluorescent compounds such as dyes.

Commercially available sequencing apparatus are capable of sequencing large numbers of samples labeled with fluorescent dyes in parallel. Recently developed methods, referred to as "next-generation sequencing", NGS, have revolutionized sequencing. NGS allows the massively parallel sequencing of clonally amplified or single DNA molecules that are spatially separated in a flow cell or by generation of an oil-water emulsion. NGS allows thousands or even millions to billions of sequencing reactions to be performed simultaneously.

In NGS, sequencing is performed by repeated cycles of polymerase-mediated nucleotide extensions or, in one format, by iterative cycles of oligonucleotide ligation. As a massively parallel process, NGS generates hundreds of megabases to gigabases of nucleotide-sequence output in a single instrument run, depending on the platform. The inexpensive production of large volumes of sequence data is the primary advantage over conventional methods.

NGS platforms and common applications/fields for NGS technologies are e.g. reviewed in Voelkerding et al, Clinical Chemistry 55:4 641-658, 2009 and Metzker, Nature Reviews/Genetics Volume 11, January 2010, pages 31-46 and in Sara Goodwin et al.; Nature Reviews Genetics, Volume 17, June 2016, pages 333-351.

In NGS, various oligonucleotides of interest are covalently attached to a support. Subsequently, a nucleotide labeled with a fluorescent dye is attached to the growing oligonucleotide chain with DNA polymerase. When the four nucleotides are labeled with different fluorescent dyes, fluorescent signals emitted from a probe can be detected and the type of nucleotide attached to the oligonucleotide can be identified. After detection, the fluorescent dye is cleaved off and the next synthesis cycle is carried out, in which a new labeled nucleotide is attached to the growing chain. By carrying out multiple cycles, the sequence of a growing oligonucleotide chain can be determined in a stepwise manner. The working steps are carried out in an automated sequencing apparatus.

US 2010/0323350 A1 and WO 2009/117119 A1 relate to methods and compositions for determining the identity of nucleic acids in nucleotide sequences using, for example, data obtained from sequencing by synthesis methods.

WO 2008/097455 A1 relates to an imaging system for exciting and measuring fluorescence on or in samples comprising fluorescent materials, e.g. fluorescent labels, dyes or pigments, in particular to detect fluorescent labels on nucleic acid. Moreover, a device is disclosed being configured such that fluorescent labels in a plurality of different DNA templates are simultaneously detected.

WO 2014/020137 A1 relates to a method for enriching target sequences from a sequencing library to provide a target enriched sequencing library, wherein the sequencing library is suitable for massive parallel sequencing and comprises a plurality of double-stranded nucleic acid molecules.

Fluorescent signals emitted from sample probes with labeled molecules are weak, but the signals have to be detected with high precision and specificity. Thus, precise optical equipment, especially cameras and scanning technology, is required for such processes.

In addition, extensive evaluation of the digital images captured by an optical imaging system of the sequencing apparatus is necessary for obtaining a precise and reliable result of the sequencing, e.g. in FASTQ.

The invention is, inter alia, based on the recognition that objects observed with an optical system, e.g. a microscope, may be blurred, e.g., due to diffraction of light by the optical system. Thus, light emanating from two neighboring, yet physically separate objects, can considerably overlap in the detector plane, e.g., causing a mixture or combination of the signals of the neighboring objects. This overlap may be referred to as neighbor influence in the context of the invention.

Because of the superposition property, neighbor influence may mutually increase the detected light intensity of spatially close beads. This can deteriorate the quality of the decision whether a specific base is at a given position. Furthermore, it can lead to erroneous classification of originally dim beads as live beads and can therefore cause incorrect base calls. Furthermore, neighbor influence may decreases contrast between dim and live beads, potentially impeding determination of proper thresholds for their discrimination. Moreover, because of the overlapping or mixing of the signals of neighboring objects, the objects may appear as if multiple different DNA strands are attached to one object (polyclonality).

Further still, a bright object may dominate the actual signal due to neighboring influence such that the original sequence may be lost. Instead, an optical duplicate could be read-out, which could be statistically disadvantageous in latter processing steps.

In any case, such neighboring effects may lead to a loss of data.

It is therefore an object of the invention to provide a method and a system, which, among others, overcomes the above mentioned problems of the prior art. In particular, one object is to compensate neighbor influence.

This object is achieved with the features of the independent claims. The dependent claims relate to further aspects of the invention.

The method according to the present invention is computer-implemented. However, it is understood by the skilled person that there are also other ways of implementing the method according to the present invention.

The invention relates to a method of neighbor influence compensation between a plurality of objects in at least one digital image, wherein the at least one digital image contains image information about a plurality of objects. Each of the plurality of objects is configured to receive at least one molecule comprising genetic information, wherein the at least one molecule is configured to receive a fluorescent compound. Furthermore, the at least one digital image is taken by an optical imaging system during emission of electromagnetic radiation of the fluorescent compounds received by the at least one molecules. The method comprises the following steps, preferably in the following order:

a) providing a model describing the imaging of the objects by the optical system, which model defines equations, the equations relating determined intensities of the electromagnetic radiation having traversed the optical system with original intensities of the electromagnetic radiation;

b) determining intensity values of the plurality of objects on the basis of the at least one digital image; and c) determining compensated intensity values of the plurality of objects on the basis of the determined intensity values and the model by solving the equations for the original intensities.

In other words, the method according to the present invention may be adapted for determining compensated intensity values, which may correspond to the original intensity values of the electromagnetic radiation emitted by the fluorescent compounds, by finding solutions to equations defined by the model describing the imaging procedure of the objects in the optical system. Thus, the compensated values may correspond to the solutions for the original values of the equations. For example, the compensated values may be equal to the solutions for the original values. The compensated intensity values may also be denoted as reconstructed intensity values. In other words, the neighbor influence compensation algorithm may approximately restore the original fluorescence intensities underlying the imaging process to attenuate aforementioned consequences of neighbor influence.

In this way, effects that are due to the light traversing the optical system causing a blurring of the objects, can be compensated.

The at least one object may be a bead. Such beads are commercially available, e.g., Dynabeads of Thermo Fisher. For example, the image may contain image information about 400000 or more beads.

The object may also be a live-bead having received at least one DNA/RNA strand. The DNA/RNA strand may be a single stranded DNA/RNA fragment. However, the at least one object may also be a bead which does not have received a DNA/RNA strand. In other words, the neighbor influence effect may be independent from the presence of DNA/RNA, since each signal contribution may be relevant, for example, because the model used for neighbor influence compensation may only depend on the sum of the separate signal contributions.

The method of neighbor influence compensation described herein may also be carried out in beadless sequencing methods. Thus, it may be understood that each of the plurality of objects includes at least one molecule.

Each DNA strand may be configured to receive molecules, preferably nucleotides. The nucleotides may comprise one cleavable fluorescent compound and a cleavable cap. Furthermore, the molecules may be a plurality of four different molecules each having a fluorescent compound specific for each of the four different molecules. Thus, each object may radiate electromagnetic radiation with a certain intensity. Furthermore, each DNA/RNA strand received by an object may have received such a molecule. The intensity of the electromagnetic radiation radiated by the objects may be referred to as original intensity. On the other hand, the intensities that are determined by the optical imaging system may be referred to as determined intensities or raw intensities.

The optical imaging system preferably comprises of an illumination device, e.g. an LED, to activate/stimulate the fluorescent compound(s) to excite electromagnetic radiation and a detection system, e.g. a CCD detector, to detect the emission spectra (electromagnetic radiation) of the fluorescent compound(s).

The method may be carried out over a plurality of cycles and may be applied over a defined cycle-range. Each of the plurality of cycles may be characterized in that one of four molecules is attached to one of the DNA strands, wherein the cleavable cap ensures that only one molecule is attached to one DNA strand during one cycle. After each one of the cycles, the cleavable cap may be removed so that another molecule can be attached to the DNA strand in the next cycle. At the same time, the fluorescent compound may be removed from the at least one molecule.

For each cycle, a plurality, preferably four, digital images, i.e. pictures, may be taken, one for each of the four fluorescent compounds attached to the molecules. For example, each one of the plurality of digital images may be taken with a different color filter. Furthermore, each one of the four fluorescent compounds may have one of a main emission spectra in the red, blue, yellow or green spectral regime.

The model described herein may be understood to describe and/or define image formation of the plurality of objects by the optical system. In other words, the model may describe the influence of the optical system on the electromagnetic radiation emitted by the fluorescent compounds. Furthermore, the model may also include information about the objects emitting the electromagnetic radiation. In the context of the invention, electromagnetic radiation may be understood to be light with a wavelength between 380 nm and 780 nm, preferably between 445 nm and 720 nm. It may be understood that imaging the objects refers to imaging the electromagnetic radiation emitted by the fluorescent compounds attached to the objects.

For example, in the model, each object radiating the electromagnetic radiation may be described with a disk function describing a uniform disk with a given radius R. Thus, the disk function may depend on a parameter R describing the radius of the radiating object. Furthermore, the model may also include a function that describes the diffraction of the electromagnetic radiation traversing the optical system. The parameter of the disk function R may, e.g., be predetermined. For example, the parameter R may be provided prior to the execution of the method. Alternatively, the parameter R may also be determined during the method described herein.

Preferably, the model includes a point spread function of the optical system.

The point spread function may, for example, be approximated by a two-dimensional Gaussian function depending on a parameter $\sigma$ describing the blurring of the objects by the optical system. The parameter $\sigma$ describing the blurriness may, e.g., be predetermined. For example, the parameter $\sigma$ describing the blurriness may be provided prior to the operation of the method. Alternatively, the parameter $\sigma$ describing the blurriness may also be determined during the method described herein.

Preferably, the digital image is partitioned into domains, each domain containing one object, wherein the model describes the determined intensities in terms of original intensities and weights, and wherein a separate weight is associated to each pair of objects and domains.

In other words, the model may be described in terms of weights $w_{ij}$, wherein the weight denotes the influence of the j-th bead onto the i-th domain $\Omega_i$. In this context, the i-th domain may refer to an area of the detector, which detector determines the intensities for taking the digital image, where the i-th bead is measured. Thus, in a mathematical sense, $\Omega_i$ may be understood to be the domain of definition of a function defining the weight.

Preferably, the method further comprises the following step, preferably before step b):

d) determining the weights;

Preferably, the method is carried out over a plurality of cycles and step d) is carried out prior to the plurality of cycles.

Since the weights may only have to be determined once, the computing power necessary for carrying out the method can be reduced.

For example, the weights may be determined by numerical integration. In order to determine the weight $w_{ij}$, information about the domain $\Omega_i$ as well as about the position of the j-th bead may be provided.

Preferably, the model is only described by weights, where the distance between the object and the domain associated to the weight is below a predetermined cut-off distance.

In other words, the equations may be approximated by only considering weights $w_{ij}$, where the distance between the objects i and j is below a given cut-off distance. Thus, it may be assumed that the raw or determined intensity of a first object is only substantially influenced by other second objects in the neighborhood of the first object. In this way, the complexity of the equations may be reduced such that solving the equations may be simplified and the computing power may be reduced.

Preferably, in step c), a solution to the equations is determined by determining an approximated solution with an iterative algorithm.

For example, in a first iteration, a first approximate solution for the original intensities may be found, wherein the first approximate solution only depends on weights describing the influence of the beads to their own measurements, i.e., wherein the first approximate solution only comprises weights $w_{ii}$. In a second iteration, said first approximate solution may be used for determining a second approximate solution where neighbor influence effects are included. In general, the (n−1)-th approximate solution may be used for determining the n-th approximate solution.

In this way, a solution to the family of inverse problems defined by the equations can be found.

Preferably, the method further comprises the following step, preferably being a sub-step of step c):

f) stopping the iterative algorithm of step c) if a predetermined maximum number of iterations is exceeded.

The maximum number of iterations may amount to 20 iterations, preferably to 15 iterations, more preferably to 10 iterations. It has been found that such a maximum number of iterations produces a good result.

Preferably, the method further comprises the following step, preferably during step c):

g) determining an error of the compensated intensity values;

wherein the iterative algorithm of step c) is stopped if the predetermined maximum number of iterations is exceeded or if the determined error is below a given threshold.

In this way, it can be ensured that the compensated intensity values are determined with a predetermined or desired accuracy.

Preferably, the model depends on at least one parameter, wherein, preferably, the at least one parameter includes a radius of the plurality of objects and/or a blurriness of the at least one objects in the at least one digital image.

For example, the radius of the plurality of objects may correspond to the parameter R of the disk function described in the context of the invention and the blurriness may correspond to the parameter $\sigma$ of the Gaussian function of the point spread function.

Preferably, the method further comprises the following step, preferably between steps a) and b):

e) determining the at least one parameter by processing the at least one digital image.

Preferably, the method is carried out for a plurality of cycles, wherein step e) is carried out once for the plurality of cycles, preferably prior to the plurality of cycles.

Thus, in each cycle, intensities may be determined, wherein a new nucleotide is attached to each object. The parameters may be determined before the cyclic operation of steps b) and c) is carried out.

Preferably, the method is carried out for a plurality of cycles, wherein steps b) and c) are carried out in every cycle of the plurality of cycles.

Thus, in each cycle, intensities may be determined, wherein a new nucleotide is attached to each object. The weights may be determined before the intensities are determined with the optical system. As the weights may not vary in time, it may not be necessary to re-determine the weights during the cyclic operation of steps b) and c).

Preferably, the at least one digital image comprises a plurality of digital images, wherein each digital image of the plurality of digital images is taken with a different filter, the different filters preferably being different color filters. Furthermore, the steps b), c) and d) are carried out separately for each digital image of the plurality of digital images.

The first image may be taken such that it contains image information in a first frequency range and the second image may be taken such that it contains image information in a second frequency range. For example, the first image may be taken with a first color filter and the second image may be taken with a second color filter.

Another aspect of the invention relates to a system for neighbor influence compensation between a plurality of objects in at least one digital image, wherein the at least one digital image contains image information about a plurality of objects. Furthermore, each of the plurality of objects has received at least one molecule comprising genetic information, wherein the at least one molecule is configured to receive a fluorescent compound. Still further, the at least one digital image is taken by an optical imaging system during emission of electromagnetic radiation of the fluorescent compounds received by the at least one molecules. The system comprises:

i) a memory unit containing a model describing the imaging of the objects by the optical system, which model defines equations, the equations relating determined intensities of the electromagnetic radiation having traversed the optical system with original intensities of the electromagnetic radiation;

ii) an intensity determination unit configured for determining intensity values from the digital image for the plurality of objects;

iii) a processing unit configured for determining compensated intensity values of the plurality of objects on the basis of the determined intensity values and the model by solving the equations for the original intensities.

In other words, the system may relate to an evaluation system, e.g. for DNA/RNA sequencing.

It is to be understood that the embodiments disclosed herein which relate to a method, also relate to a system comprising means adapted for carrying out the respective method steps. Therefore, the definitions, explanations, effects, and examples given with respect to the method also describe a corresponding system.

Another aspect of the invention relates to a computer program product comprising one or more computer readable media having computer executable instructions for performing the steps of the method described herein.

For example, the model describing the imaging of the objects, the equations defined by the model, and/or the algorithm for solving the equations may be described as following.

Light traversing the optical path from a point in the focal plane may become spread over the detector in a characteristic way. This characteristic spread may be denoted as the impulse response, or more specifically, the point spread function (PSF) of the imaging system. Because it may be assumed that the superposition principle holds for linear optical systems (such as light microscopes), image formation can be described by the convolution of the object space (given by its intensity distribution Q) with the PSF:

$$I(u, v) = \iint_{\mathbb{R}^2} Q(x, y) \cdot PSF(u - x, v - y) dx dy \quad (1)$$

In general, the PSF may distribute the light over an area exceeding the physical dimensions of the object. Hence, light emanating from two neighboring, yet physically separate objects can considerably overlap in the detector plane. This overlap is referred to as neighbor influence.

Here, the object space may be composed of objects such as micro beads, i.e., non-overlapping spheres with similar radii. Furthermore, it may be assumed that a uniform disk is a sufficiently accurate model for the projection of the beads onto two-dimensional space constituting the focal plane. Hence, the disk function $$D(\vec{r}) = \begin{cases} 1/\pi R^2, & \|\vec{r}\| < R \\ 0, & \text{otherwise} \end{cases} \quad (2)$$

may model the projection of a bead with radius R, which is centered at the origin and normalized, i.e., $\int_{\mathbb{R}^2} D(\vec{r}) d\vec{r} = 1$.

Thus, the object space Q may formally be written as the sum of N disk-shaped bead-projections with intensities $q_i$ at positions $p_i$:

$$Q(\vec{r}) = \sum_i^N q_i D(\vec{r} - \vec{p}_i). \quad (3)$$

Similarly, it may be assume that a 2-dimensional Gaussian function approximates the PSF sufficiently well and define $$PSF(\vec{r}) = \frac{\pi}{c} e^{-c\|\vec{r}\|^2} \quad (4)$$

with $c = 1/2\sigma^2$. Like the disk function, the integral of the Gaussian may also be normalized to 1. Substituting equations (3) and (4) into equation (1), may result in a model of the image:

$$I(\vec{r}) = \iint_{\mathbb{R}^2} \left[ \sum_i^N q_i D(\vec{r} - \vec{p}_i) \right] \cdot \frac{\pi}{c} e^{-c\|\vec{r} - \vec{u}\|^2} d\vec{u}. \quad (5)$$

Because integration is a linear operation, Equation (5) can be re-written to read $$I(\vec{r}) = \sum_i^N q_i \frac{\pi}{c} \iint_{\mathbb{R}^2} D(\vec{r} - \vec{p}_i) e^{-c\|\vec{r} - \vec{u}\|^2} d\vec{u} \quad (6)$$

Thus, the image may be seen as the sum of N individual bead-images weighted by their corresponding intensities. Furthermore, the integral does only depend on the bead positions but is independent from the bead intensities. For an isolated bead at position p, the sum disappears from equation (6) and assuming unit intensity, equation (6) results in a simpler expression $$I_{\vec{p}}(\vec{r}) = \frac{\pi}{c} \iint_{\mathbb{R}^2} D(\vec{r} - \vec{p}) e^{-c\|\vec{r} - \vec{u}\|^2} d\vec{u}. \quad (7)$$

To determine how much this isolated bead contributes to the intensity recorded on a certain area $\Omega$ of the detector, equation (7) may be integrated over the area $\Omega$. Thus, the area $\Omega$ may be understood to be the domain of the integral in equation (7). This integral may be defined in terms of a weight function $$\begin{aligned} f_n(\Omega) &= \iint_\Omega I_{\vec{p}_n}(\vec{\omega}) d\vec{\omega} \\ &= \frac{\pi}{c} \iint_\Omega \iint_{\mathbb{R}^2} D(\vec{r} - \vec{p}_n) e^{-c\|\vec{r} - \vec{\omega}\|^2} d\vec{r} d\vec{\omega} \\ &= \frac{1}{\pi R^2} \iint_\Omega e^{-2c\|\vec{\omega}\|^2} \int_0^R u e^{-2cu^2} (2c\|\vec{\omega}\|^2 u) du d\vec{\omega}, \end{aligned} \quad (8)$$

The weight function may be seen as a model of the fraction of the intensity of the n-th bead which is recorded within the sample domain $\Omega$.

To extract an estimate of the intensity of the i-th bead from the image, the intensity of a small domain $\Omega_i$ containing the i-th bead may be measured. This measurement $M_i$ may be termed raw intensity. The contribution of the i-th bead to its own measurement may then be given by $q_i f_i(\Omega_i)$. Similarly, the contribution of the j-th bead to the same measurement may be $q_j f_j(\Omega_i)$ Comparing equations (8) a (6), it may be found that the raw intensity of the i-th bead is determined by the sum $$M_i = \sum_j^N q_j f_j(\Omega_i). \quad (9)$$

The weight function may only depend on the relative positioning of the beads, which may remain constant because the beads may be tethered to the flow cell. Hence, it may be sufficient to determine the weights $$w_{ij} = f_j(\Omega_i) \quad (10)$$

once and reuse them in every sequencing cycle.

Equations (9) and (10) describe an inhomogeneous linear system with coefficients $w_{ij}$. However, with N>300000 beads, solving the linear system directly is prohibitively expensive. As the weight function may decay rapidly, such that influences from distant beads can possibly be neglected, the raw intensity of the i-th bead may be determined by considering only the beads in its neighborhood $$\phi_i = \{j : \|p_i - p_j\| < d_{max}, i \neq j\}, \quad (11)$$

where $d_{max}$ is the cutoff distance. Consequently, the raw intensity from equation (9) may approximately be written as $$M_i \cong \sum_{j \in \phi_i \cup \{i\}} q_j w_{ij}. \quad (12)$$

Equation (12) can be solved for the intensity of the i-th bead by $$q_i \cong \frac{M_i - \sum_{j \in \phi_i} q_j w_{ij}}{w_{ii}}. \quad (13)$$

From equation (13), an iterative scheme can be derived.

$$q_i^{(0)} = M_i / w_{ii} \quad (14)$$

$$q_i^{(k)} = \frac{M_i - \sum_{j \in \phi_i} q_j^{(k-1)} w_{ij}}{w_{ii}}.$$

A modification of this scheme, which is possibly improved in every iteration, may be found by considering the upper bound for the error, which may be determined by the absolute value of the difference of the last sequence element and its predecessor:

$$\varepsilon_i^{(k)} = |q_i^{(k)} - q_i| \leq |q_i^{(k-1)} - q_i^{(k)}|. \quad (15)$$

$\varepsilon_i^{(k)}$ can potentially be large even if $\varepsilon_i^{(k-1)} \approx 0$. The arithmetic mean $\bar{q}_i^{(k)} = \frac{1}{2}(q_i^{(k)} + q_i^{(k)})$ may lie exactly in the middle of the interval bounded by $q_i^{(k-1)}$ and $q_i^{(k)}$. Thus, $\bar{q}_i^{(k)}$ may be a better estimate for the real $q_i$ than the worse of the last two sequence elements, or mathematically $|\bar{q}_i^{(k)} - q_i| < \max\{|q_i^{(k-1)} - q_i|, |q_i^{(k)} - q_i|\}$.

Thus, a faster and more robust approximation scheme for the intensities may read:

$$q_i^{(0)} = M_i / w_{ii} \quad (16)$$

$$\hat{q}_i^{(k)} = \frac{M_i - \sum_{j \in \phi_i} q_j^{(k-1)} w_{ij}}{w_{ii}}$$

$$q_i^{(k)} = \frac{q_i^{(k-1)} + \hat{q}_i^{(k)}}{2}.$$

Some exemplary embodiments are now described with reference to the drawings. For explanation purpose, various specific details are set forth, without departing from the scope of the present invention as claimed.

DETAILED DESCRIPTION OF EXEMPLARY EMBODIMENTS

Figure 1:
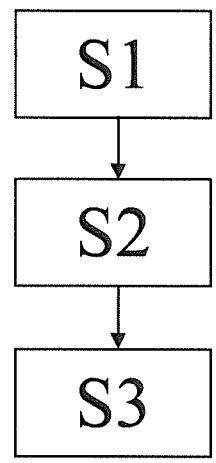
FIG. 1 illustrates a method according to an exemplary embodiment of the invention.

FIG. 1 illustrates a method of neighbor influence compensation between a plurality of objects in at least one digital image according to an exemplary embodiment of the invention. According to the method, the at least one digital image contains image information about a plurality of objects, wherein each of the plurality of objects is configured to receive at least one molecule comprising genetic information, and wherein the at least one molecule is configured to receive a fluorescent compound. Furthermore, the at least one digital image is taken by an optical imaging system during emission of electromagnetic radiation of the fluorescent compounds received by the at least one molecules. The method comprises the following steps, preferably in the following order:

S1: providing a model describing the imaging of the objects by the optical system, which model defines equations, the equations relating determined intensities of the electromagnetic radiation having traversed the optical system with original intensities of the electromagnetic radiation;

S2: determining intensity values of the plurality of objects on the basis of the at least one digital image; and S3: determining compensated intensity values of the plurality of objects on the basis of the determined intensity values and the model by solving the equations for the original intensities.

According to exemplary embodiments, the model includes a point spread function describing the influence of the optical system onto the electromagnetic radiation traversing the optical system and/or a disk function describing the object radiating the electromagnetic radiation. According to an exemplary embodiment, the model and thus the equations depend on at least one parameter, preferably on a blurriness caused by the optical system and/or a radius of each of the plurality of objects. According to an exemplary embodiment, said parameter or parameters are determined by processing the at least one digital image, preferably at the beginning of the method.

According to an exemplary embodiment, the equations defined by the model include weights $w_{ij}$ describing the influence of an object j on a domain i. Hereby, in theory, the domain may relate to an area of the detector of the optical system, where electromagnetic radiation of the i-th object is detected. According to an exemplary embodiment, the weights are determined numerically, preferably before the intensities are cyclically determined.

According to a further exemplary embodiment, only such weights are considered in the equations, wherein a distance between the object j and the domain i (i.e. the i-th object associated to the i-th domain) is below a cut-off distance.

According to a further exemplary embodiment, the equations are solved iteratively. In other words, first a 0-th order solution is determined which is used for determining the 1-st order solution. Subsequently, the 1-st order solution is used for determining the 2-nd order solution. In general, the (n−1)-th order solution is used for determining the n-th order solution. According to exemplary embodiments, the iterative algorithm is stopped, if a predetermined maximum number of iterations is reached and/or if the error of the solution of the last iteration is below a given (e.g. predetermined) threshold.

Figure 2:
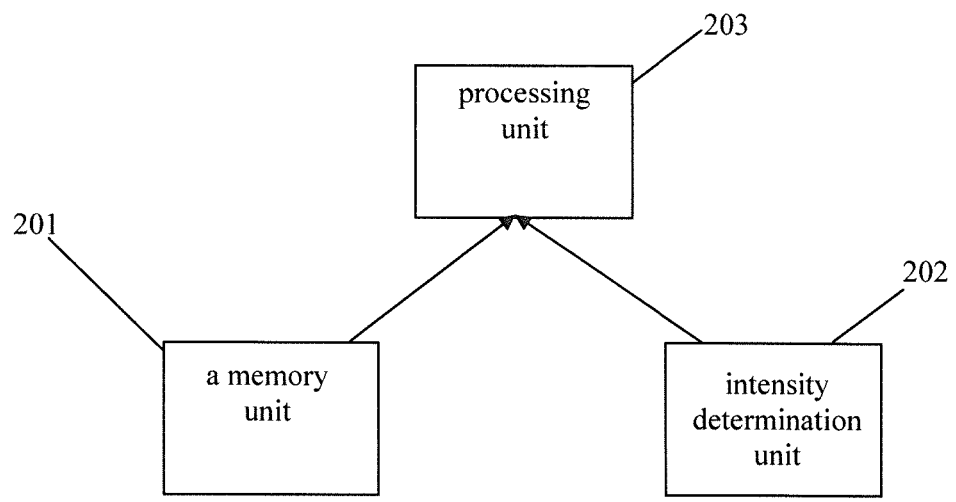
FIG. 2 illustrates a system according to an exemplary embodiment of the invention.

FIG. 2 illustrates a system for neighbor influence compensation between a plurality of objects in at least one digital image according to an exemplary embodiment of the invention. The at least one digital image contains image information about a plurality of objects, wherein each of the plurality of objects has received at least one molecule comprising genetic information, and wherein the at least one molecule is configured to receive a fluorescent compound. Furthermore, the at least one digital image is taken by an optical imaging system during emission of electromagnetic radiation of the fluorescent compounds received by the at least one molecules.

The system comprises a memory unit 201 containing a model describing the imaging of the objects by the optical system, which model defines equations, the equations relating determined intensities of the electromagnetic radiation having traversed the optical system with original intensities of the electromagnetic radiation. In other words, a model describing the influence on light traversing the optical system Furthermore, the system includes an intensity determination unit 202 configured for determining intensity values from the digital image for the plurality of objects. Further still, the system includes a processing unit 203 configured for determining compensated intensity values of the plurality of objects on the basis of the determined intensity values and the model by solving the equations for the original intensities. The processing unit 203 may further be configured for carrying out other method steps described in the context of the invention.

Figure 3:
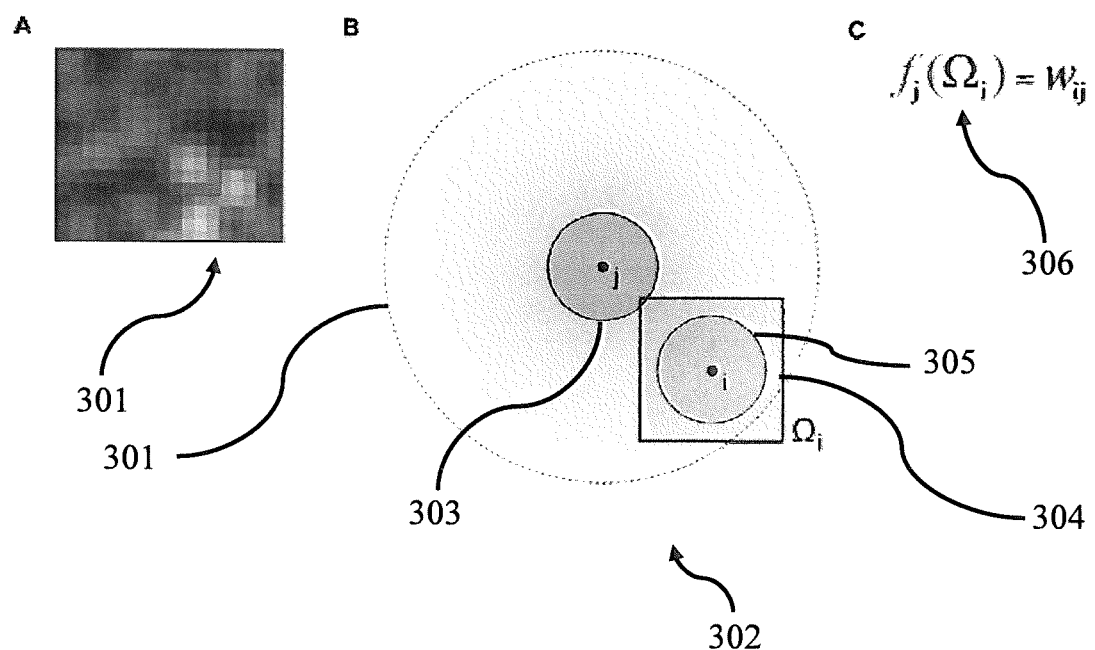
FIG. 3 illustrates the effect of neighbor influence and the definition of weights according to an exemplary embodiment of the invention.

FIG. 3 illustrates the effect of neighbor influence. Portion 301 of FIG. 3 exemplarily shows an image of the plurality of objects. The individual objects, i.e. beads, are strongly blurred. This is, inter alia, due to the blurring effect of the imaging system which causes that radiation of individual objects overlap at the detector. According to an exemplary embodiment, this effect is described by weights $w_{ij}$ illustrated in portions 302 and 306 of FIG. 3. In portion 302, a i-th object 305 and a j-th object 303 are depicted. The i-th object 305 defines a domain $\Omega_i$ 304, corresponding to an area of the detector, in which the i-th object 305 is detected. Due to the effects of the optical system, in the i-th domain 304 not only electromagnetic radiation of the i-th object is received and detected. On the contrary, due to the effect of the imaging system, also radiation of the j-th object 303 is detected in the i-th domain 304. This effect is described by the weight $w_{ij}$ 306. Theoretically, there is a weight $w_{ij}$ for each pair of i and j. However, according to an exemplary embodiment of the invention it was realized that the equations can be simplified by assuming that the j-th object 303 only has an effect on domains within the neighborhood 307, i.e. such that the distance between the j-th and i-th object is below a cut-off distance.

Figure 4A:
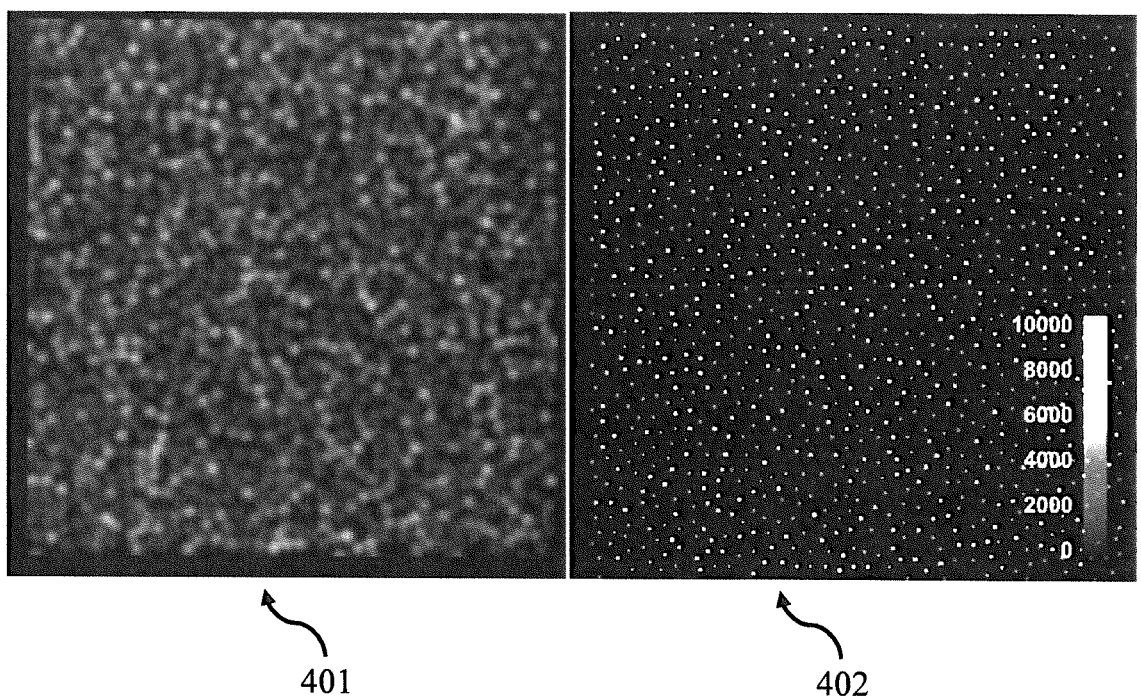
FIG. 4A illustrates a synthetic image showing the raw intensities and an image showing a reconstruction of the original intensities by neighbor influence compensation according to an exemplary embodiment of the invention.

FIG. 4A illustrates a synthetic image 401 showing raw intensities and an image 402 showing a reconstruction of the original intensities by neighbor influence compensation according to an exemplary embodiment of the invention. In the synthetic image 401, the image of the individual objects is blurred and the intensities of the individual objects may overlap, in part due to neighbor influence. The raw intensities may be determined on the basis of an image corresponding to the synthetic image 401. For illustration purposes, raw intensities have been determined on the basis of the synthetic image 401. The so determined raw intensities may, however, be defective, e.g., due to neighbor influence as described herein.

The reconstructed image 402 is obtained by processing the raw intensities determined from the synthetic image 401 with a neighbor influence compensation method according to an exemplary embodiment. In other words, the reconstructed image 402 contains compensated intensities which closely correspond to the original intensities of the electromagnetic radiation emitted by the objects.

Figure 4B:
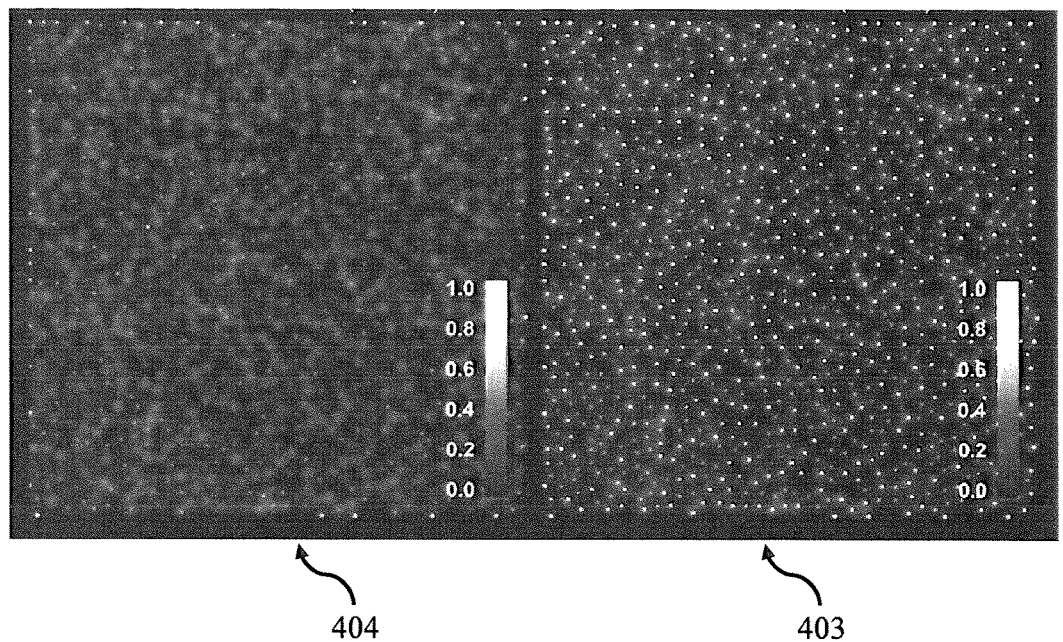
FIG. 4B illustrates overlays of the synthetic images and the relative errors of the reconstruction before and after neighbor influence compensation according to an exemplary embodiment of the invention.

FIG. 4B illustrates overlays 403, 404 of the synthetic images and the relative error of the reconstruction before and after neighbor influence compensation according to an exemplary embodiment of the invention. Overlay 403 hereby shows the relatives errors of the reconstructed objects before/without neighbor influence compensation, which relative errors are indicated by the brightness of the reconstructed objects. Similarly, overlay 404 shows the relative errors of the reconstructed objects after neighbor influence compensation. As can be clearly seen, the relative errors of the reconstructed objects are significantly smaller after applying neighbor influence compensation. Thus, neighbor compensation may increase the accuracy of the determined positions and/or intensities of objects.

Figure 5:
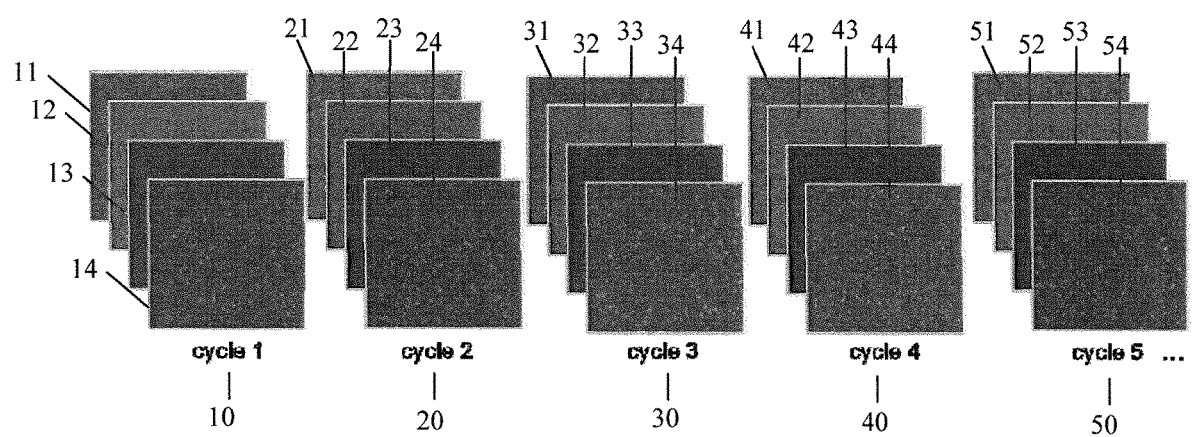
FIG. 5 illustrates the images taken in different cycles according to an embodiment of the present invention.

FIG. 5 illustrates the images 11-14, 21-24, 31-34, 41-44, 51-54 taken in a plurality of cycles 10-50 of the method. This illustration should not be construed as limiting as of the amount of images taken in a corresponding cycle or the amounts of cycles. As can be seen in FIG. 6 in each of the cycles 10-50 four images 11-14, 21-24, 31-34, 41-44, 51-54 are taken, i.e. acquired, captured etc., in this example. In particular, each of the four images 11-14, 21-24, 31-34, 41-44, 51-54 in one cycle 10-50 corresponds to one channel of the optical imaging system, i.e. red, green, yellow and blue. For example, every first image may be taken with a first color filter, every second image with a second color filter, every third image with a third color filter, and every fourth image with a fourth color filter. The different colors are emitted by fluorescent compounds carried by different molecules which are received by DNA strands attached to the objects (beads). More particular, each of the different fluorescent compounds represents one of a specific DNA base, i.e. thymine (T), adenine (A), cytosine (C), and guanine (G). For example, the fluorescent compounds are associated to the DNA bases as follows: T=green; A=yellow; C=blue; and G=red.

In each cycle 10-50 the first images 11, 21, 31, 41, 51 corresponds to one of the four channels T, A, C, G, e.g. G. The second images 12, 22, 32, 42, 52 then correspond to a second one of the remaining three channels T, A, C, e.g. C. The third images 13, 23, 33, 43, 53 then correspond to a third one of the remaining two channels T, A, e.g. A. The fourth images 14, 24, 34, 44, 54 then correspond to a fourth one of the remaining channel, e.g. T.

The forgoing method steps and the system of the exemplary embodiments have been described as relating to DNA/RNA sequencing. However, as it will be apparent to the person skilled in the art the present invention is not restricted to this technical field. It is clear that the solution of the present invention can be applied to numerous other technical fields, where fluorescent images comprising different types of objects are analyzed. That is, the objects do not have to be beads, but can also be any kind of fluorescent emitting objects.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfill the functions of several features recited in the claims. The terms "essentially", "about", "approximately" and the like in connection with an attribute or a value particularly also define exactly the attribute or exactly the value, respectively.

The invention claimed is:

1. A method of neighbor influence compensation between a plurality of objects in at least one digital image, wherein:
   the at least one digital image contains image information about the plurality of objects,
   each of the plurality of objects being configured to receive at least one molecule comprising genetic information,
   the at least one molecule being configured to receive a fluorescent compound, and
   the at least one digital image being taken by an optical imaging system during emission of electromagnetic radiation of the fluorescent compound received by the at least one molecule,
   wherein the method comprises the following steps:
   a) providing a model describing the imaging of the objects by the optical imaging system, wherein the model defines equations, the equations relating determined intensities of the electromagnetic radiation having traversed the optical imaging system with original intensities of the electromagnetic radiation;
   b) determining intensity values of the plurality of objects based on the at least one digital image; and
   c) determining compensated intensity values of the plurality of objects based on the determined intensity values and the model by solving the equations for the original intensities.

2. The method of claim 1,
wherein the model includes a point spread function of the optical imaging system.

3. The method of claim 1,
wherein the at least one digital image is partitioned into domains, each domain containing one object,
wherein the model describes the determined intensities in terms of the original intensities and weights, and
wherein a separate weight is associated to each pair of objects and domains.

4. The method of claim 3, further comprising the following step before step b):
   d) determining the weights;
   wherein the method is carried out over a plurality of cycles and step d) is carried out prior to the plurality of cycles.

5. The method of claim 3,
wherein the model is only described by weights, wherein a distance between an object and a domain associated to a weight is below a predetermined cut-off distance.

6. The method of claim 1,
wherein, in step c), a solution to the equations is determined by determining an approximated solution with an iterative algorithm.

7. The method of claim 6, further comprising the following sub-step of step c):
   f) stopping the iterative algorithm of step c) if a predetermined maximum number of iterations is exceeded.

8. The method of claim 7, further comprising the following step during step c):
   g) determining an error of the compensated intensity values;
   wherein the iterative algorithm of step c) is stopped if the predetermined maximum number of iterations is exceeded or if the determined error is below a given threshold.

9. The method of claim 1,
wherein the model depends on at least one parameter, and
wherein the at least one parameter includes a radius of the plurality of objects or a blurriness of at least one object in the at least one digital image.

10. The method of claim 9, further comprising the following step between steps a) and b):
    e) determining the at least one parameter by processing the at least one digital image.

11. The method of claim 10,
wherein the method is carried out for a plurality of cycles, and
wherein step e) is carried out once prior to the plurality of cycles.

12. The method of claim 1,
wherein the method is carried out for a plurality of cycles, and
wherein steps b) and c) are carried out in every cycle of the plurality of cycles.

13. The method of claim 1,
wherein the at least one digital image comprises a plurality of digital images,
wherein each digital image of the plurality of digital images is taken with a different filter, the different filters being different color filters, and
wherein the steps b), c), and d) are carried out separately for each digital image of the plurality of digital images.

14. A system for neighbor influence compensation between a plurality of objects in at least one digital image, wherein:
    the at least one digital image contains image information about the plurality of objects,
    each of the plurality of objects having received at least one molecule comprising genetic information, the at least one molecule being configured to receive a fluorescent compound, the at least one digital image being taken by an optical imaging system during emission of electromagnetic radiation of the fluorescent compound received by the at least one molecule, wherein the system comprises:
- i) a memory unit containing a model describing the imaging of the objects by the optical imaging system, wherein the model defines equations, the equations relating determined intensities of the electromagnetic radiation having traversed the optical imaging system with original intensities of the electromagnetic radiation;
- ii) an intensity determination unit configured for determining intensity values from the at least one digital image for the plurality of objects; and
- iii) a processing unit configured for determining compensated intensity values of the plurality of objects based on the determined intensity values and the model by solving the equations for the original intensities.

15. A computer program product stored on a non-transitory medium, wherein:

at least one digital image contains image information about a plurality of objects, each of the plurality of objects being configured to receive at least one molecule comprising genetic information, the at least one molecule being configured to receive a fluorescent compound, and the at least one digital image being taken by an optical imaging system during emission of electromagnetic radiation of the fluorescent compound received by the at least one molecule, wherein the computer program product comprises computer executable instructions for performing the following steps:
- a) providing a model describing the imaging of the objects by the optical imaging system, wherein the model defines equations, the equations relating determined intensities of the electromagnetic radiation having traversed the optical imaging system with original intensities of the electromagnetic radiation;
- b) determining intensity values of the plurality of objects based on the at least one digital image; and
- c) determining compensated intensity values of the plurality of objects based on the determined intensity values and the model by solving the equations for the original intensities.

16. The system of claim 14, wherein the at least one digital image is partitioned into domains, each domain containing one object, wherein the model describes the determined intensities in terms of the original intensities and weights, and wherein a separate weight is associated to each pair of objects and domains.

17. The system of claim 16, wherein the model is only described by weights, wherein a distance between an object and a domain associated to a weight is below a predetermined cut-off distance.

18. The system of claim 14, wherein the processing unit is further configured for determining an approximated solution to the equations with an iterative algorithm.

19. The computer program product of claim 15, wherein the at least one digital image is partitioned into domains, each domain containing one object, wherein the model describes the determined intensities in terms of the original intensities and weights, and wherein a separate weight is associated to each pair of objects and domains.

20. The computer program product of claim 15, further comprising computer executable instructions for performing the following step:

determining an approximated solution to the equations with an iterative algorithm.

* * * * *